United States Patent [19]

Okisu et al.

[11] Patent Number: 5,159,187

[45] Date of Patent: Oct. 27, 1992

[54] DOCUMENT READING APPARATUS HAVING A VARIABLE DESIGNATING IMAGE

[75] Inventors: Noriyuki Okisu, Amagasaki; Shinya Matsuda, Kyoto; Toshihiko Karasaki, Kawachinagano, all of Japan

[73] Assignee: Minolta Camera Co., Ltd., Osaka, Japan

[21] Appl. No.: 743,503

[22] Filed: Aug. 9, 1991

Related U.S. Application Data

[62] Division of Ser. No. 588,651, Sep. 26, 1990.

[30] Foreign Application Priority Data

Sep. 29, 1989 [JP] Japan ................ 1-256095
Sep. 29, 1989 [JP] Japan ................ 1-256096
Sep. 29, 1989 [JP] Japan ................ 1-256097

[51] Int. Cl.⁵ .................. G01V 9/04; G06K 9/20
[52] U.S. Cl. ................... 250/208.1; 250/221; 382/61; 340/707; 358/453
[58] Field of Search ........... 382/61, 9, 48; 340/707, 340/706, 784 I, 763; 358/453, 452, 450; 250/221, 222.1, 560, 561, 359, 571, 208.1

[56] References Cited

U.S. PATENT DOCUMENTS

| | | | |
|---|---|---|---|
| 3,885,861 | 5/1975 | Farnsworth et al. | 356/252 |
| 4,430,526 | 2/1984 | Brown et al. | 340/707 |
| 4,471,386 | 9/1984 | Tuhro | 358/280 |
| 4,498,002 | 2/1985 | Tekirdaglis | 250/221 |
| 4,720,750 | 1/1988 | Watanabe | 358/300 |
| 4,734,789 | 3/1988 | Smith et al. | 340/705 |
| 4,907,095 | 3/1990 | Komura et al. | 358/451 |
| 4,908,716 | 3/1990 | Sakano | 358/453 |
| 4,965,678 | 10/1990 | Yamada | 358/452 |
| 5,019,917 | 5/1991 | Hata et al. | 358/452 |

FOREIGN PATENT DOCUMENTS 62-276958 12/1987 Japan.
63-232568 9/1988 Japan.

OTHER PUBLICATIONS

Pamphlet of Color Image File System and Image Scanner (XS. CAM2) manufactured by Mitsubishi Electric Corp.; May 1989 Aug. 1988.
Pamphlet of Copier (EP04300) manufactured by Minolta Camera K. K. Feb. 1989 (Date of First Sale).
Pamphlet of Image Scanner (DS-300) manufactured by Chinon K. K. Apr. 1989.
Pamphlet of Digital Copier (8010) manufactured by Konica K. K. Apr. 1989.
Pamphlet of Image Scanner (PIC-2350S) manufactured by Ikegami Tsushin KIki K. K. Nov. 1989.

Primary Examiner—David C. Nelms
Assistant Examiner—Michael Messinger
Attorney, Agent, or Firm—Price, Gess & Ubell

[57] ABSTRACT

A document reading apparatus comprising a document table, a reading section disposed above the document table for reading a document placed on the document table. The reading section includes a sensor for detecting variations of brightness within a selected reading area of the document which is designated by light beams prior to a reading operation. This apparatus further comprises a display device for displaying the image of the selected reading area.

14 Claims, 15 Drawing Sheets

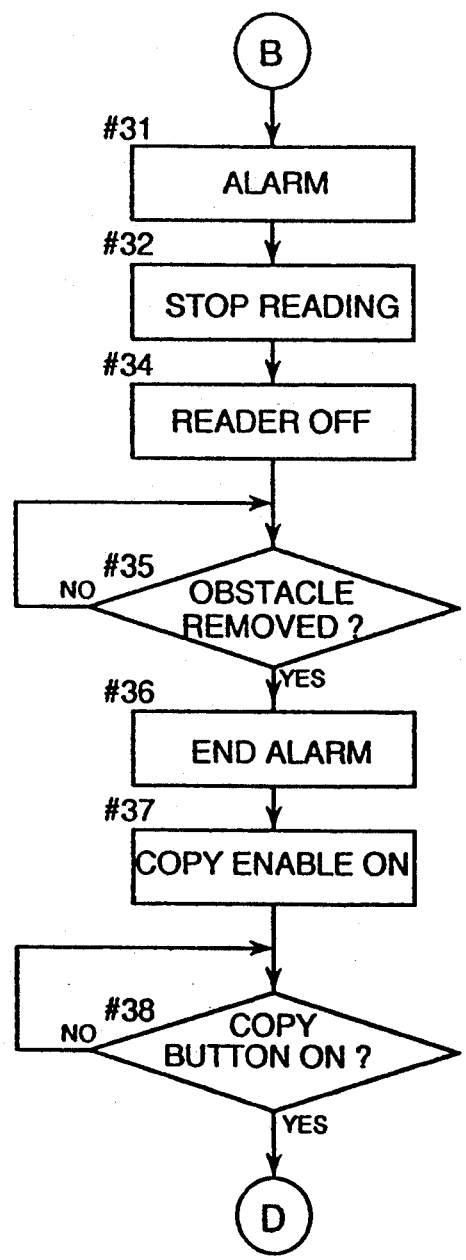

DOCUMENT READING APPARATUS HAVING A VARIABLE DESIGNATING IMAGE

This is a division of prior application Ser. No. 588,651 filed on Sept. 26, 1990 for a DOCUMENT READING APPARATUS.

TECHNICAL FIELD

The present invention relates to a reading apparatus for reading an original and providing image information.

BACKGROUND OF THE INVENTION

This type of reading apparatus, generally, employs a mode for reading a document placed at a predetermined distance, and in particular a mode for reading, from above, a document placed face up. Certain improvements are desired of such an image reading apparatus. For example, a satisfactory result cannot be obtained if an obstacle enters a space between a document and an image reader for reading the document during a reading operation.

To cope with such a situation, some apparatus known in the art read a document and display its image on a display device. In this case, if an obstacle enters the space between the document and the image reader, the obstacle is displayed along with the document image on the display device. Upon noting the obstacle, the user carries out a reading operation all over again, However, it is not desirable for the user to have to watch the display device carefully during a reading operation.

A different problem arises when a reading area is input to the apparatus for reading only a selected portion of a document. Regarding this area designation, there is a type of apparatus which reads a document and displays its image on a display device for allowing the user to designate a desired area on the display device. In another type of apparatus, a document is placed on a pressure sensitive board for the user to designate a desired area by pressing the document with a pen or the like. A further apparatus is known from the Japanese patent application laid open under No. 63-232568, in which positions of a document read are monitored by light beams or spot light during a reading operation, and the user turns the scanning operation on and off while watching a monitor screen for reading only a desired area of the document. It is also possible to designate a desired area of a document by marking it with a marker pen.

The apparauts that allows the user to designate an area of a document on a display device is complicated and expensive since the display device is required. With this type of apparatus, an area cannot be designated prior to a reading operation. The apparatus including a pressure sensitive board for designating an area on a document surface does not allow the designation on a thick document. The apparatus in which a scanning operation is turned on and off for reading a selected area of a document is difficult to operate and tends to invite errors. Designation of an area with a marker pen has the disadvantage of marring the document.

One of the aspects currently desired is that confirmation is made of an area of a document to be read when reading the document. To meet this demand, certain apparatus have a document table defining a reading range of a document, and others indicate a reading range by means of scales provided on a document table. A further apparatus is known from the Japanese patent application laid open under No. 62-276958, in which spot or line light is movable with a scanning operation by a reading sensor to illuminate a position of the document currently read.

The apparatus disclosed in the above publication does not show an entire reading range at a time, and is inconvenient for positioning of a document prior to a reading operation. The other apparatus have the disadvantage of failing to show clearly which part of a document is read if the document is larger than the document table. The part of a document is not clearly recognizable even when the document is small.

SUMMARY OF THE INVENTION

An object of the present invention is to provide a document reading apparatus which overcomes the disadvantages of the prior art and meets the current demand noted above.

A reading apparatus according to the present invention is constructed to automatically detect entry of an obstacle into a readable area, that is detect variations of brightness in that area. This apparatus is capable of efficient reading of a document, and thus positively avoiding errors in the output of document copies and the like.

Further, with the reading apparatus of the present invention, a desired reading area of any type of document may be designated reliably through an easy operation which is carried out by means of light emission.

In addition, the reading apparatus of the present invention can clearly show a reading area prior to a reading operation. This feature allows the user to confirm the reading area with ease and to effect positional adjustment as necessary.

In a preferred embodiment of the present invention, a document reading apparatus comprises document reading means for reading a document placed at a predetermined distance therefrom, detecting means for detecting brightness variations over an area readable by the document reading means, and display means for providing a display in response to the detecting means. According to this construction, during a document reading operation, a corresponding output is made and brightness variations within the reading area are detectable. An alarm is given if brightness variations are detected during the reading operation, thereby precluding errors in copying or printing the document.

The document reading apparatus may further comprise a second detecting means for detecting reinstatement of previous brightness following the brightness variations detected by the first-mentioned detecting means, and canceling means operable in response to the second detecting means for canceling the display provided by the display means. According to this construction, the alarm is automatically stopped upon reinstatement of the previous brightness after the detection of brightness variations.

In a further preferred embodiment of the invention, a document reading apparatus comprises document reading means for reading a document placed at a predetermined distance therefrom, light emitting means for emitting light for designating an area on the document, and recognizing means for recognizing the area designated by the light emitted from the light emitting means.

According to this construction, the detecting means detects the light emitted from the light emitting means to the desired area of the document, the detection result being used by the recognizing means in determining the location of the desired area. This allows image information corresponding to the designated area to be extracted from the image information read by the document reading means.

This apparatus is simple, inexpensive and easy to operate compared with the apparatus which requires a display device for the user to designate a desired area. Efficiency may be promoted since an area may be designated prior to a reading operation. Further, since the area is not designated on a pressure sensitive board, the area designation may easily be made for a thick document as well. The area designating operation is easy and reliable compared with the case of designating an area while watching a monitor screen during scanning of the document. This apparatus is free from the problem of marring the document as is the case with designation by means of a marker pen.

In a still further preferred embodiment of the present invention, a document reading apparatus comprises document reading means for reading a document placed at a predetermined distance therefrom, and light emitting means for emitting light to an area of the document to be read by the document reading means, the light emitting means having a variable light emitting range.

According to this construction, light may be emitted to the document surface prior to a reading operation, to clearly indicate a reading area of the document. Consequently, the user can confirm the reading area regardless of the document size, and position the document easily and accurately for optimal reading results.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 7A, 7B and 7C are flowcharts illustrating a normal copying and printing operation of the apparatus.

DETAILED DESCRIPTION OF THE PREFERRED EMBODIMENTS

A document reading apparatus embodying the present invention will be described hereinafter.

Figure 1:
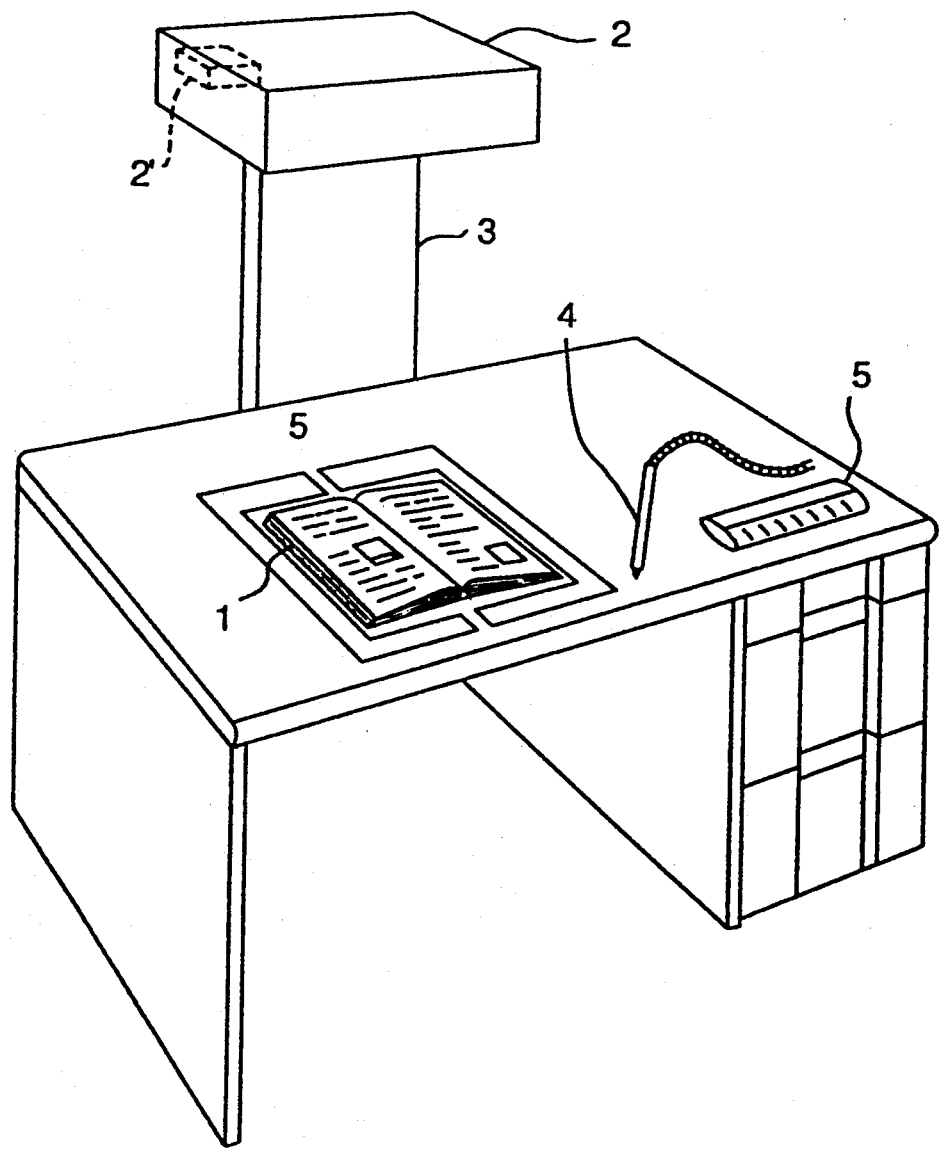
FIG. 1 shows an outward appearance of an image reading apparatus according to the present invention.

FIG. 1 shows the overall construction of a document reading apparatus. With this apparatus, a document 1 is placed face up on a document table, and a document reading section 2 is mounted in position for reading the document 1 from above. The reading section 2 is supported by a support column 3, with an appropriate distance between the document 1 and reading section 2. This distance is such as to allow visual recognition of at least a readable area over a document surface at all times, and provides a working space between the document 1 and reading section 2. The illustrated apparatus further comprises a control unit 2' (including a CPU 24 and other components to be described later) for controlling a document reading operation in a predetermined sequence, a light pen 4 and operating switches and the like 5.

Figure 2:
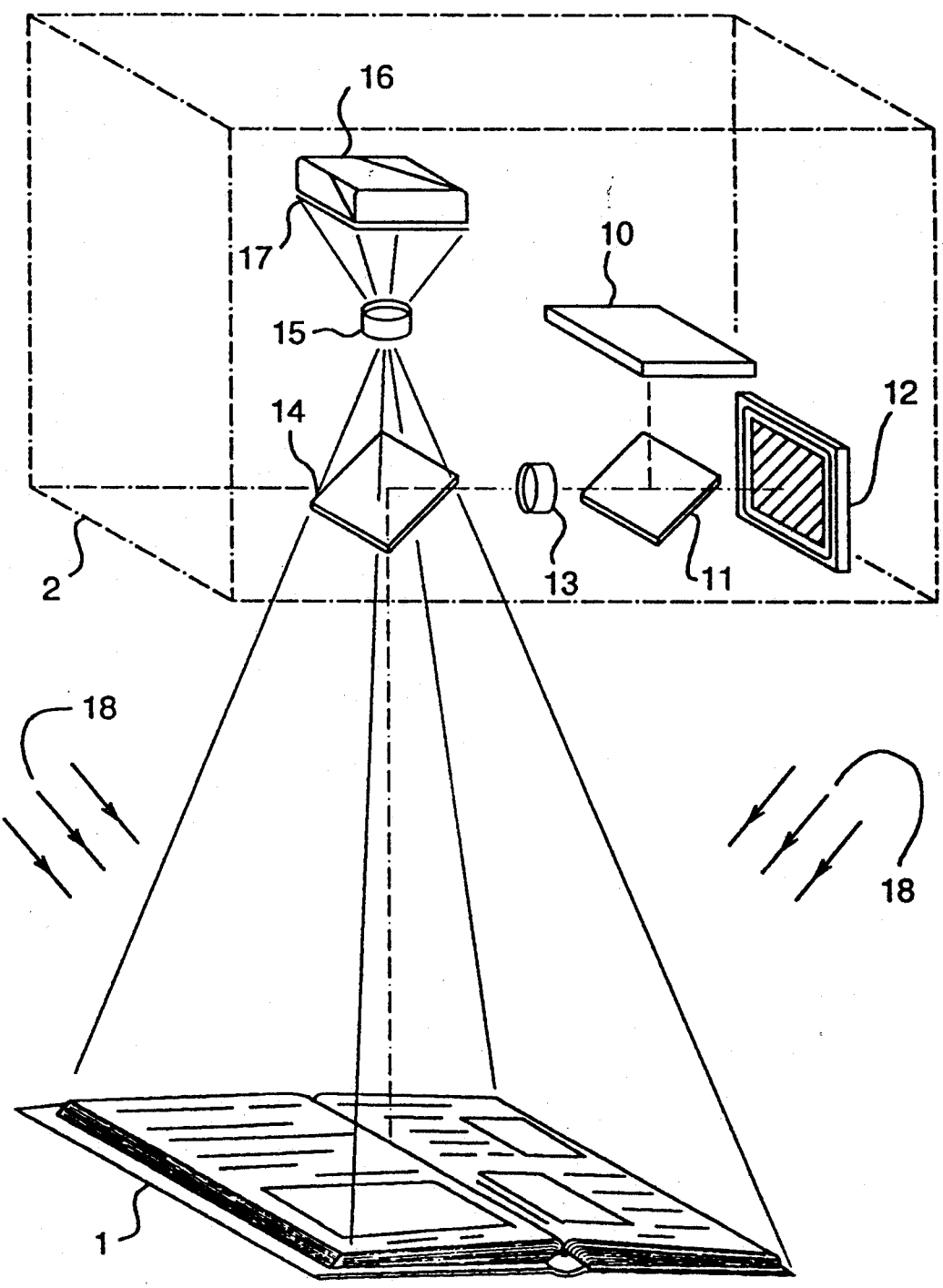
FIG. 2 is a perspective view of a reading section.

FIG. 2 shows details of the reading section 2. Image information from the document 1 is read by an image sensor 10 through a mirror 14, an imaging lens 13 and a mirror 11. The mirror 14 is what is known as a magic or one way transmission mirror which transmits only light traveling from one direction (i.e. transmits lights light from a surface light source 16 in FIG. 2, which will be described later), and reflects only light from the other direction (i.e. reflects light from the document 1 in FIG. 2). The mirror 11 is what is known as a cold mirror which transmits only infrared light and reflects visible light. The image sensor 10 comprises a semiconductor optical/electrical converter such as a CCD, and may be an area sensor or a line sensor. Further, a sensor 12 is provided which is sensitive to infrared light for recognizing a reading area and detecting an object. This sensor 12 receives infrared light having passed through the cold mirror 11. Recognition of a reading area means recognition by the document reading apparatus of a selected area of the document when only a portion of the document is to be read. Detection of an obstacle means detection of any obstacle present in the reading area during a document reading operation. Both functions may be performed by one sensor since the reading area is recognized before the reading operation while the obstacle detection is effected during the reading operation. The sensor 12 has a sensitivity range corresponding to an image pickup range of the image sensor 10.

Figure 3:
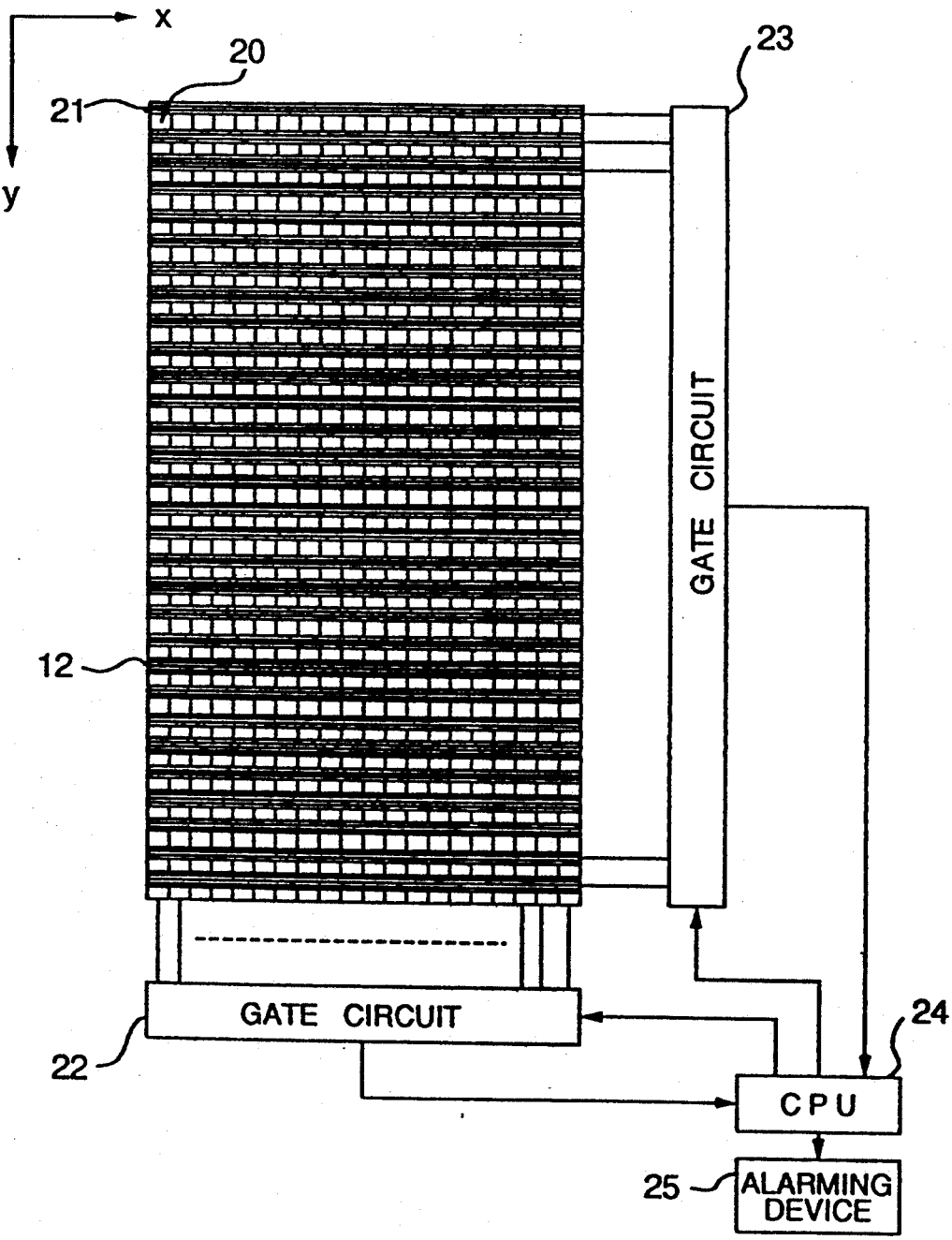
FIG. 3 is a view illustrating a sensor for recognizing a reading area and detecting an obstacle.

FIG. 3 shows the construction of the sensor 12. As seen, the sensor 12 includes position sensor elements 20 arranged in the direction of x-axis and position sensor elements 21 arranged in the direction of y-axis. Each of these linear infrared sensor elements is electrically insulated by an insulator such as an infrared transmitting insulating layer not shown. The position sensor elements 20 arranged in the x-direction are connected to a CPU 24 through a gate circuit 22, while the position sensor elements 21 arranged in the y-direction are connected to the CPU 24 through a gate circuit 23. Sensor output is monitored by the CPU 24. Upon detection of an object by monitoring the sensor output, the CPU 24 drives an alarming device 2 such as a buzzer to give an alarm.

The way in which a reading area is recognized by using this sensor 12 will be described next.

Figure 4:
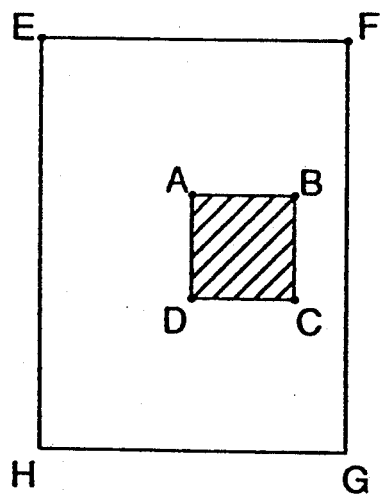
FIGS. 4 and 5 are explanatory views showing a way in which reading areas of documents are designated, respectively.
Figure 5:
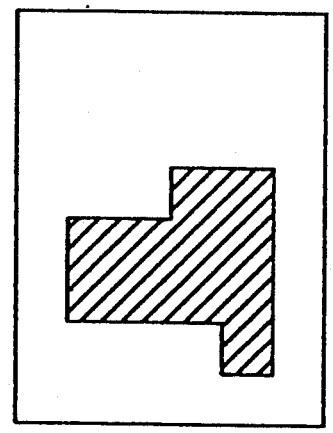

In FIG. 4, a square EFGH represents a document, and it is assumed that a hatched portion ABCD is a desired reading area. Assume that square ABCD is recognized by designating points A, B, C and D. First, the light pen 4 which emits infrared light is used to emit light at a selected point on the document surface. In FIG. 2, the infrared light is projected to the sensor 12 through the magic mirror 14, imaging lens 13 and cold mirror 11. As a result, a change occurs to outputs of the x-direction and y-direction sensor elements located at the image point of the infrared light. This change is detected by the CPU 24 in FIG. 3, whereby x, y coordinates of the image point are recognized. The reading area may be recognized by designating the four points in this way. Even a reading area having a complicated shape as depicted in FIG. 5 may be recoginized in a similar manner. Since the sensor 12 and image sensor 10 have the corresponding sensitivity region, data of only a required areas may be obtained by extracting image data from the image sensor 10 based on results of recognition.

As will be understood from FIG. 3, the area recognizing sensor 12 cannot detect a position in the x-direction if the image point of the infrared light is completely confined within one of the y-direction sensor elements 21. To avoid such a situation, the light pen may have a sufficiently large light source to project the light onto the sensor elements arranged in the x- and y-directions, or the light may be caused to form a somewhat blurred image point. Where detection is made of changes in the outputs of a plurality of sensor elements arranged in the same direction, the sensor element showing the greatest change may be regarded as representing the image point.

The way in which an obstacle is detected by using the sensor 12 will be described next.

Assume that, in FIG. 2, light beams 18 from unillustrated light sources illuminate the document surface. These beams 18 are reflected by the document surface and travel through the magic mirror 14 and imaging lens 13, and infrared components thereof pass through the cold mirror 11 to impinge upon the sensor 12. Consequently, any object present in an image pickup space covered by the image sensor 10 results in a change in the output of the sensor 12. The output of the sensor 12 is monitored by the CPU 24 in FIG. 3 for detection of an obstacle. If an obstacle is detected during a reading operation, the alarming device 25 is driven immediately to give an alarm such as by buzzing, and the reading operation is stopped. Upon removal of the obstacle, the alarm is stopped and the reading operation is carried out all over again. Where the image sensor comprises a line sensor, the reading operation may be resumed at a scan position immediately preceding the position at which the object was detected.

Further, in FIG. 3, an area for obstacle detection may be varied as desired by controlling the gate circuits 22 and 23 to select suitable x- and y-direction position sensor elements 20 and 21 for monitoring. Thus, when a reading area is designated, obstacle detection may be effected only for this area.

According to this embodiment, brightness variations over the document surface may be detected since any variations in the ambient light emitted to the document are detected.

Light beam framing will be described referring again to FIG. 2. Light beam framing means framing of a photographic range or a reading area by means of light beams, and is used in positioning the document and confirming the reading area. In FIG. 2, a uniform surface light source 16 is provided which is directed downwardly like backlight in a liquid crystal television. This light source 16 emits light through a liquid crystal shutter 17, an imaging lens 15 and the magic mirror 14 to the document surface. Preferably, this light has an illuminating range corresponding to the image pickup range of the image sensor 10.

Figure 6:
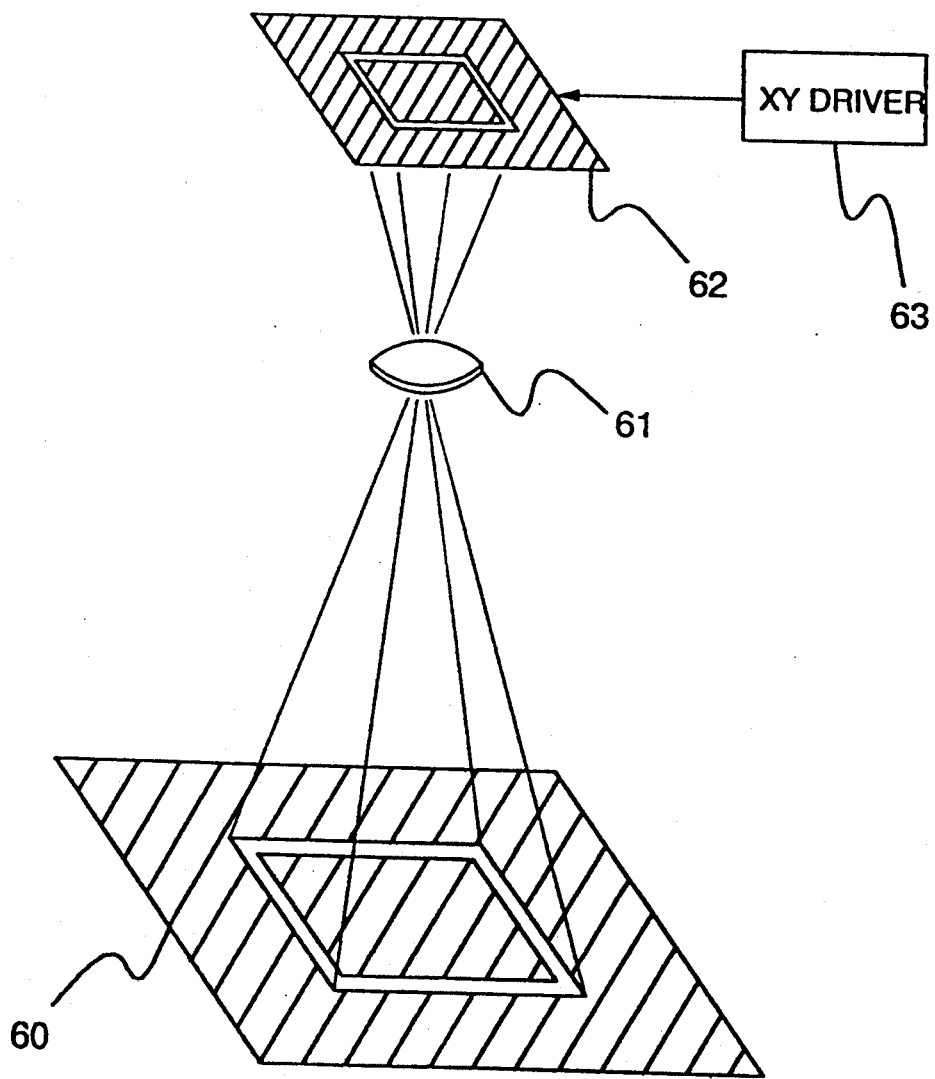
FIG. 6 is an explanatory view of light beam framing.

FIG. 6 is a view for illustrating the light beam framing. A construction for effecting the light beam framing includes an imaging lens 61, a liquid crystal shutter 62, and xy driver 63 and a light source not shown (which is the light source 16 shown in FIG. 2). The liquid crystal shutter 62 is driven by the xy driver 63 for transmitting light through an unhatched portion. The light from the light source travels through the liquid crystal shutter 62 and imaging lens 61 and impinges on a surface of a document 60. The light illuminates an unhatched portion of the document 60, thereby setting a frame thereon.

In the above example, the frame is formed by the light beams but light may be projected to illuminate the entire area inside the frame. The light beam framing is obstructive to the reading operation, and therefore the light is turned off during the reading operation or only during an integrating operation of the image sensor 10.

Figure 7A:
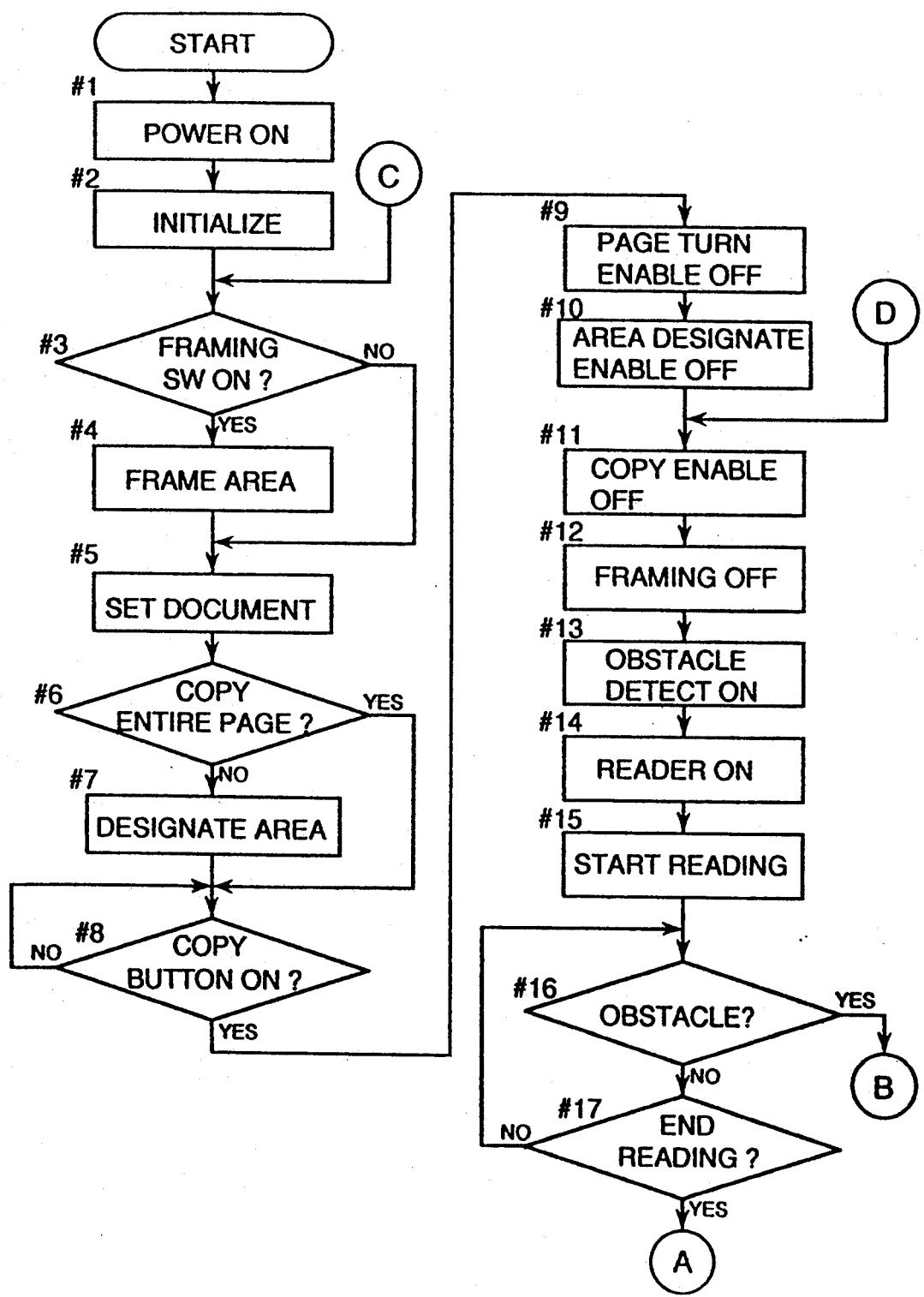
Figure 7B:
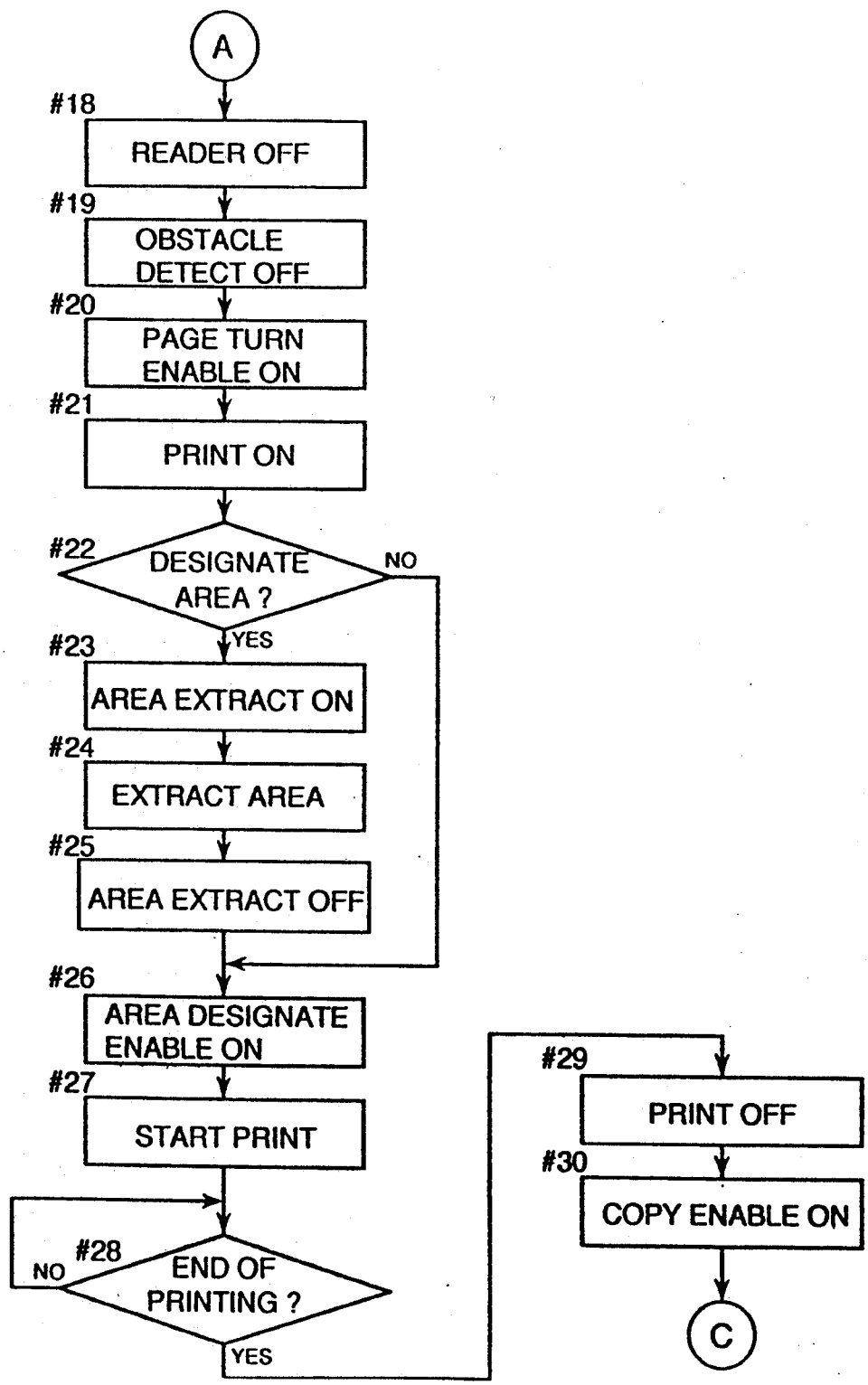

FIGS. 7A, 7B and 7C are flowcharts illustrating a normal copying and printing operation carried out with the document reading apparatus according to this embodiment.

When the user turns on an unillustrated power source at step #1, a plurality of flags as shown in Table 1 below are initialized at step #2.

TABLE 1

| Flags | ON/OFF |
| --- | --- |
| Read Flag | OFF |
| Print Flag | OFF |
| Page Turn Enable Flag | ON |
| Copy Area Extract Flag | OFF |
| Copy Area Designate Enable Flag | ON |
| Copy Enable Flag | ON |

After the flags are initialized, checking is made at step #3 whether a switch for the light beam framing is turned on. If the switched is turned on, the light beams are turned on to illuminate the reading area at step #4. The user sets a document while looking at the framing at step #5. If the light beam framing switch is not turned on at step #3, the program jumps to step #5. Next, selection is made at step #6 whether to copy an entire page or to copy only a portion of the page. If only a portion is to be copied, a copy area is designated at step #7. The apparatus memorizes this copy area. Step #7 is skipped if the entire page is to be copied.

Next, the program waits for the copy button to be pressed (step #8). When the copy button is pressed, the page turn enable flag is turned off at step #9. This flag is turned on while the user is selecting a portion to be copied, i.e. preparing for a copying operation, for indicating to the user that pages should not be turned during the copying operation.

Next, the copy area designated enable flag is turned off at step #10. As is the page turn enable flag, this flag is turned on while the user is preparing for a copying operation. Consequently, the user can designate a copy area only when this flag is turned on.

After the copy area designate enable flag is turned off, the copy enable flag is turned off at step #11. As are the two above-mentioned flags, this flag is turned on while the user is preparing for a copying operation, for indicating to the user that a coping operation may be started.

If the light beams are turned on at step #4, the beams are turned off at step #12. Then an obstacle detecting operation is started at step #13. After these steps, the read flag is turned on at step #14 for indicating that the image reader is in operation, and the reading operation is started at step #15. An obstacle detecting operation is carried out at step #16 during the reading operation. If an obstacle is detected, an alarmed is sounded at step #31 (FIG. 7C) and the reading operation is stopped at step #32. Subsequently, the read flag is turned off at step #34.

Meanwhile, at step #35, the sensor 12 is monitored for removal of the obstacle. That is, the sensor output preceding detection of the obstacle is memorized and, when the current sensor output agrees with the memorized output, it is determined that the obstacle has been removed. Upon removal of the obstacle, the alarm is stopped at step #36, the copy enable flag is turned on at step #37, and the program waits for the copy button to be pressed again at step #38. If the copy button is pressed, the program moves to step #11 (FIG. 7A) and repeats the same operations as noted hereinbefore.

If no obstacle is detected at step #16, or after the obstacle is removed, step #17 is executed to determine whether the reading operation is completed or not. If the reading operation is completed, the program moves to the flow shown in FIG. 7B, in which the read flag is turned off at step #18, the obstacle detection is turned off at step #19, the page turn enable flag is turned on at step #20, and a print flag is turned on at step #21 to indicate that a printing operation is started. Next, step #22 is executed to determine whether a copy area is designated at step #6. If a copy area is designated, the program moves to step #23. Otherwise, the program jumps to step #26. At step #23, the copy area extract flag is turned on to indicate that the copy area is being extracted. Then the designated copy area is extracted at step #24. Upon completion of the copy area extraction, the copy area extract flag is turned off at step #25. The copy area designate enable flag is turned on at step #26 to indicate to the user that he or she may select a next copy area to be read. Then a printing operation is started at step #27. When the printing operation is completed at step #28, the print flag is turned off at step #29, and the copy enable flag is turned on at step #30 to indicate that the apparatus is ready for a next reading (copying) operation. Then the program returns to step #3 in FIG. 7A for repeating the described operations.

Figure 8:
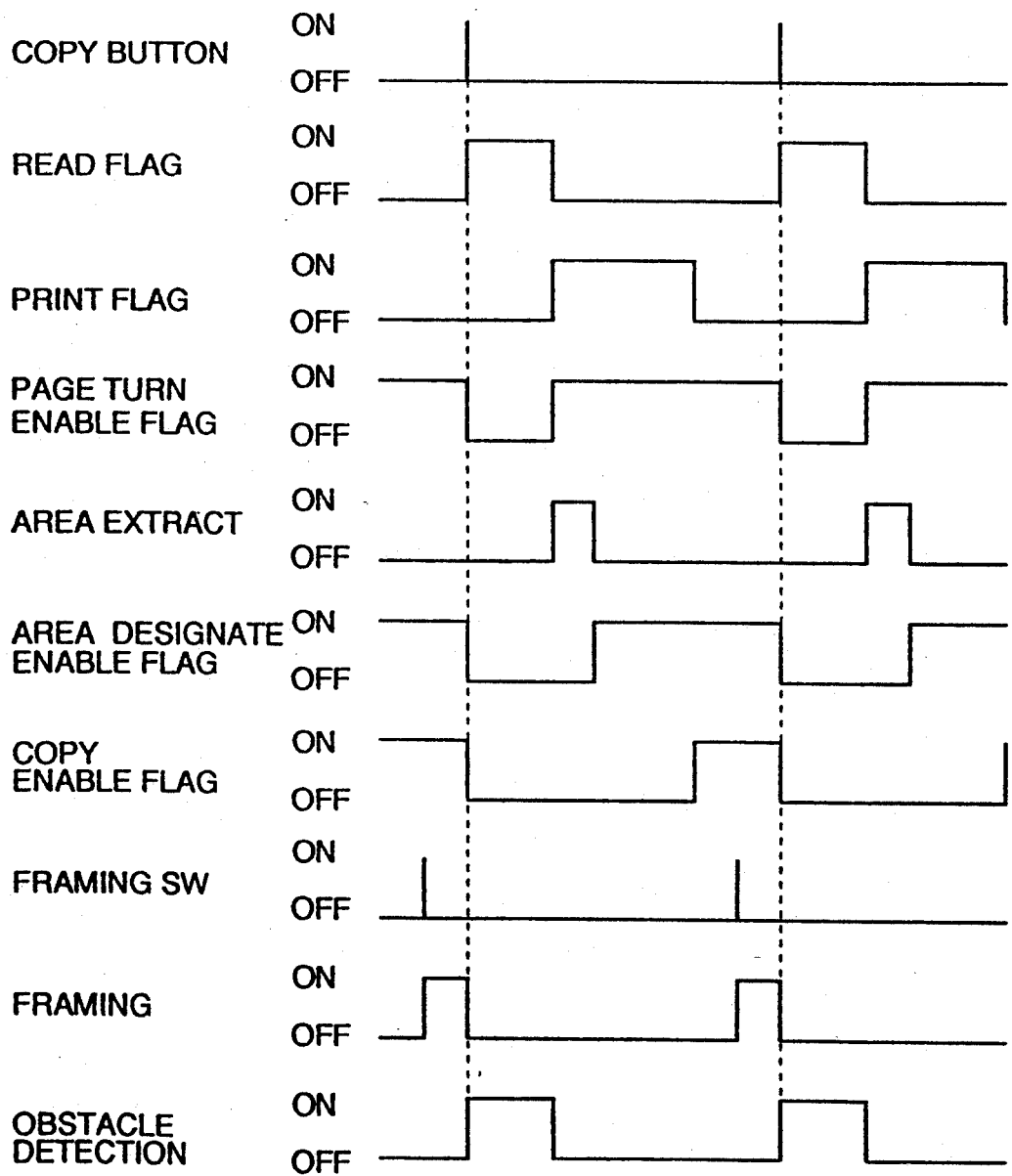
FIG. 8 is a time chart of various flags mentioned in describing the flowcharts.

FIG. 8 is a time chart of the various flags mentioned in describing the foregoing flowcharts. The status of these flags will be described in relation to a period from a point of time at which the copy button is pressed to a point of time at which the copy button is pressed a second time (which corresponds to steps #9 to #30 and steps #3 to #8 in the foregoing flowcharts).

When the copy button is pressed, the read flag is turned on to start a reading operation. Simultaneously the page turn enable flag is turned off to warn the user that pages should not be turned during the reading operation. The copy area designate enable flag and copy enable flag are also turned off to refuse designation of a copy area and operation of the copy button. The obstacle detecting operation is also initiated, and the light beam framing becomes inoperative at the same time.

When the reading operation is completed, the read flag is turned off. The reading operation may be terminated at any time after a CCD integration (in the case of a line sensor, after an integration at a final scan position). When the read flag is turned off, the print flag is turned on to start processing and printing image data read. At the same time, the page turn enable flag is turned on to indicate that pages may be turned. The obstacle detecting operation is stopped at this time. If a copy area is designated beforehand, the copy area extract flag is turned on to start extracting the copy area. Then the user confirms that the page turn enable flag is turned on, and starts looking for a next page to be copied. After the copy area is extracted, the copy area extract flag is turned off. At the same time, the copy area enable flag is turned on to indicate that designation of a copy area will be accepted. At this indication, the user designates a copy area if a portion of a certain page is to be copied. Upon completion of the printing operation, the print flag is turned off. At the same time, the copy enable flag is turned on to indicate that operation of the copy button will be accepted. The user must set the document to a proper position before copying. For this purpose, the user turns on the light beam framing switch to frame a desired reading area with the light beams. The user sets the document by referring to the resulting frame, and then presses the copying button to start copying the desired area.

Status of the page turn enable flag, copy area designate enable flag and copy enable flag among the various flags mentioned above must be known to the user, which is indicated by LEDs, buzzers or the like. Status of the read flag, print flag and print area extract flag need not be notified to the user, and may be used only as signals for control purposes. The copy button and light beam framing switch comprise touch switches or optical switches which are directly operable by the user.

Constructions for realizing the foregoing reading area extraction and light beam emission for the light beam framing will be described with reference to simplified block diagrams.

Figure 9:
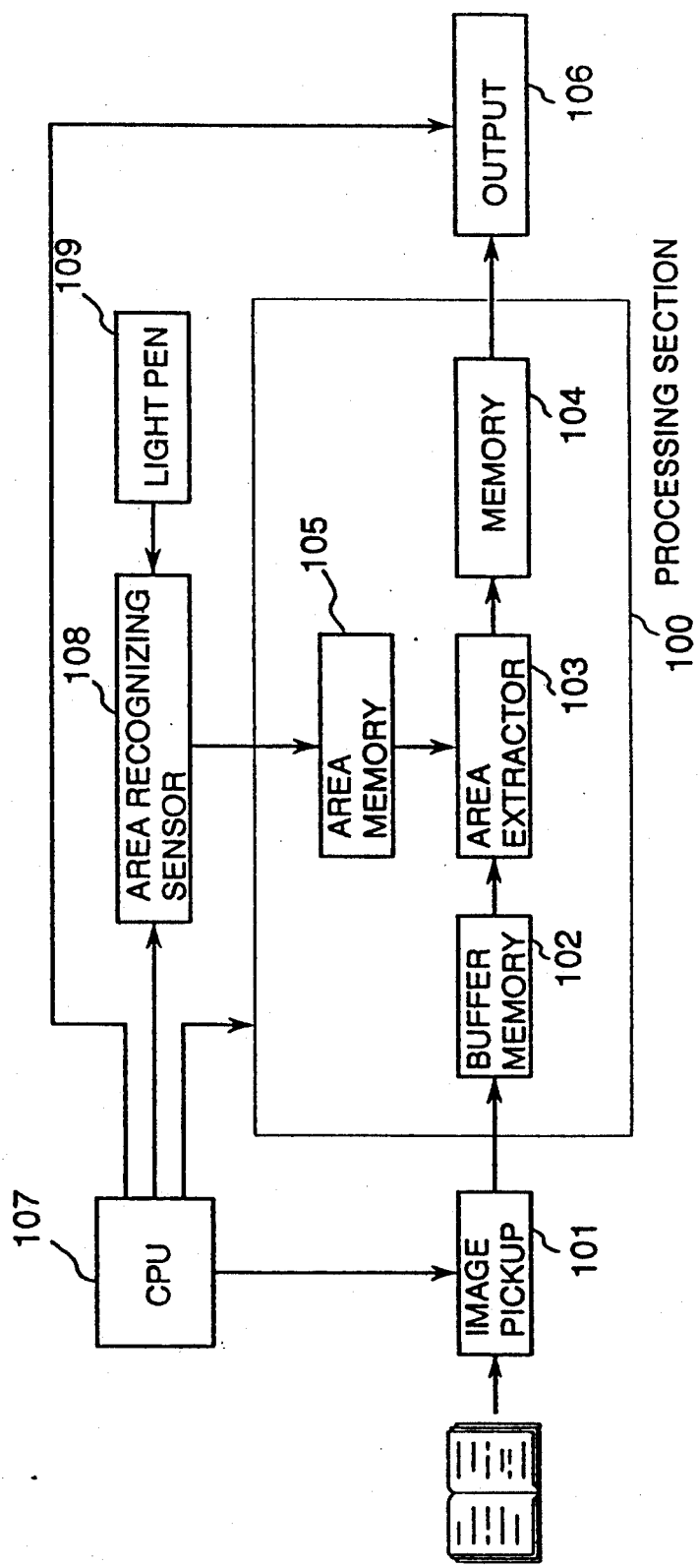
FIG. 9 is a block diagram showing a construction for extracting a reading area.

FIG. 9 is a block diagram relating to the reading area extraction. A system for extracting a reading area basically includes an image pickup section 101, a processing section 101, an output section 106, a reading area recognizing sensor 108, a light pen 109, and a CPU 107 for controlling these components. The reading area recognized by the sensor 108 is stored in a reading area memory 105 included in the processing section 100. On the othe hand, image information of the document is transmitted from the image pickup section 101 to a buffer memory 102 to be accumulated therein. Based on the reading area data stored in the memory 105, an area extractor 103 extracts only necessary information from the image information stored in the buffer memory 102. The extracted information is transmitted to a memory 104 and output from the output section 106. Naturally the sensor 108 may comprise, and it is preferable that the sensor 108 comprises, the image sensor mentioned hereinbefore.

Figure 10:
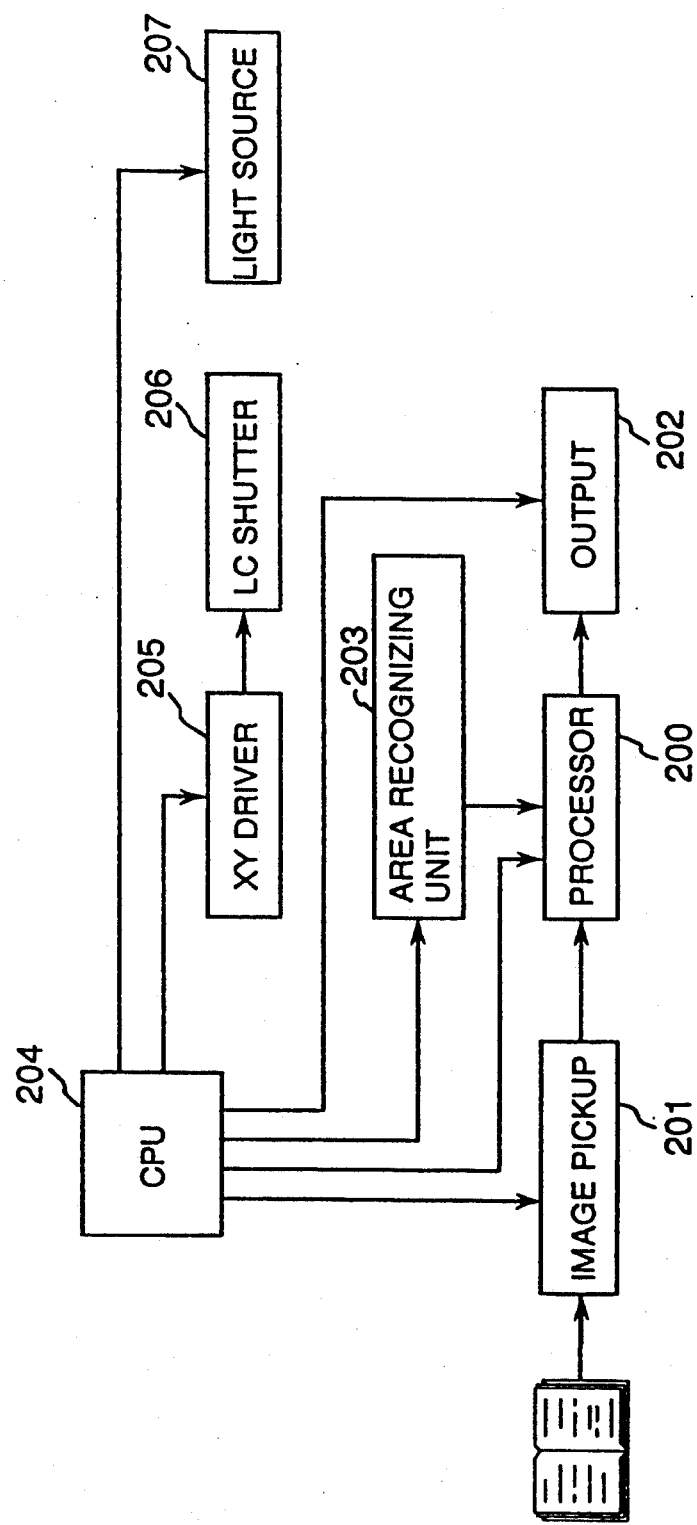
FIG. 10 is a block diagram of an electric system for emitting light beams.

FIG. 10 is a block diagram relating to the light beam emission. The illustrated system may share the components of the system described above, but different reference numerals are affixed to the components shown in FIG. 10 to avoid complication.

Image information of the document is transmitted from an image pickup section 201 through a processing section 200 to an output section 202 to be output therefrom. A CPU 204 controls the entire system. In the course of light beam framing, the CPU 204 receives data of a reading area from a reading area recognizing unit 203, which data is used for causing an xy driver 205 to control a liquid crystal shutter 206 and for turning on and off a light source 207 for the light beam framing.

Figure 11:
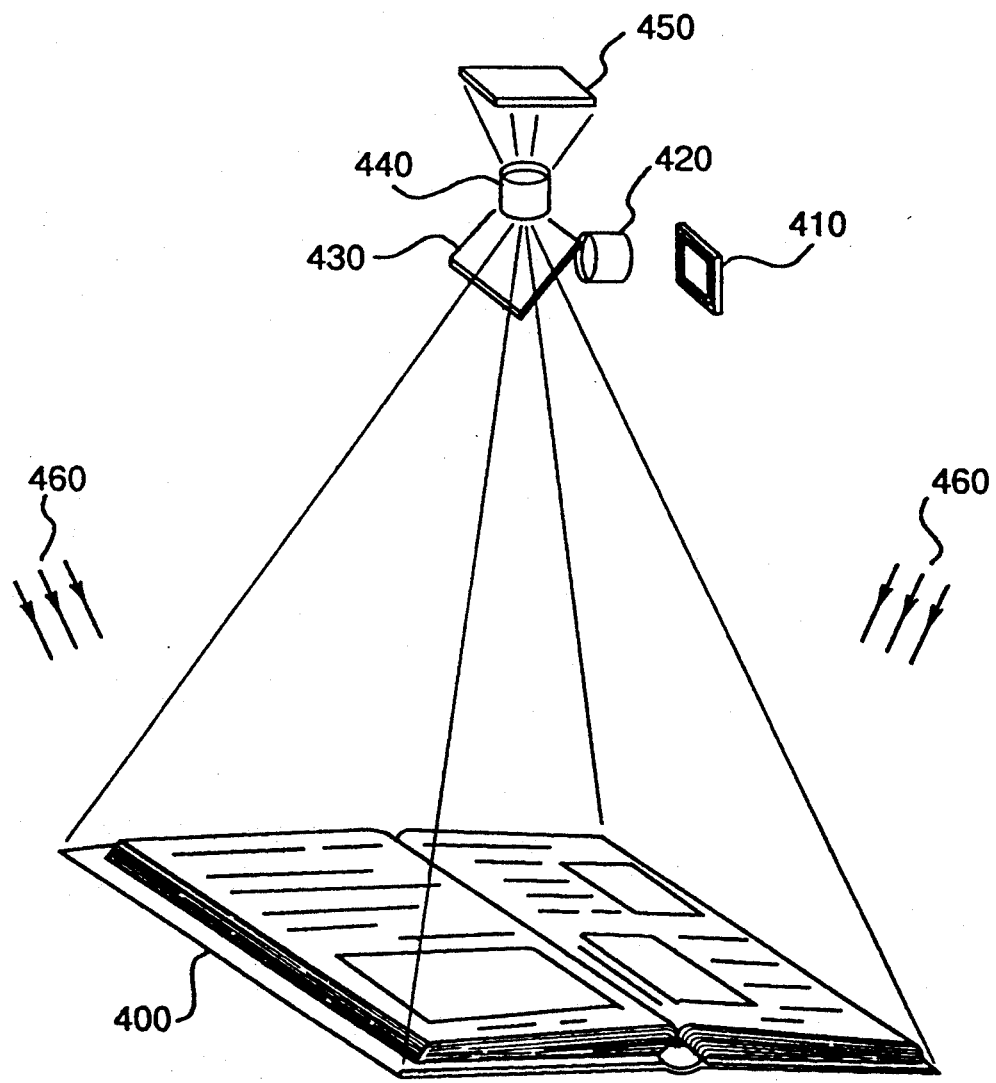
FIG. 11 is a perspective view of a modified construction for detecting an obstacle.

FIG. 11 shows a modified construction for detecting an obstacle. In FIG. 11, numeral 400 denoted a document to be read, numeral 410 an image sensor, numerals 420 and 440 imaging lenses, numeral 430 a cold mirror, numeral 450 an infrared sensor for detecting an obstacle, and numeral 460 light beams from light sources not shown. Image information of the document 400 is read by the image sensor 410 through the cold mirror 430 and imaging lens 420. Infrared components of the beams 460 reflected by the document surface are transmitted through the cold mirror 430, and received by the infrared sensor 450 through the imaging lens 440. The infrared sensor 450 has a light receiving area corresponding to an image pickup area of the image sensor 410. Consequently, any object present in the image pickup space results in a change in the output of the sensor 450. The object may be detected by detecting this change.

Figure 12:
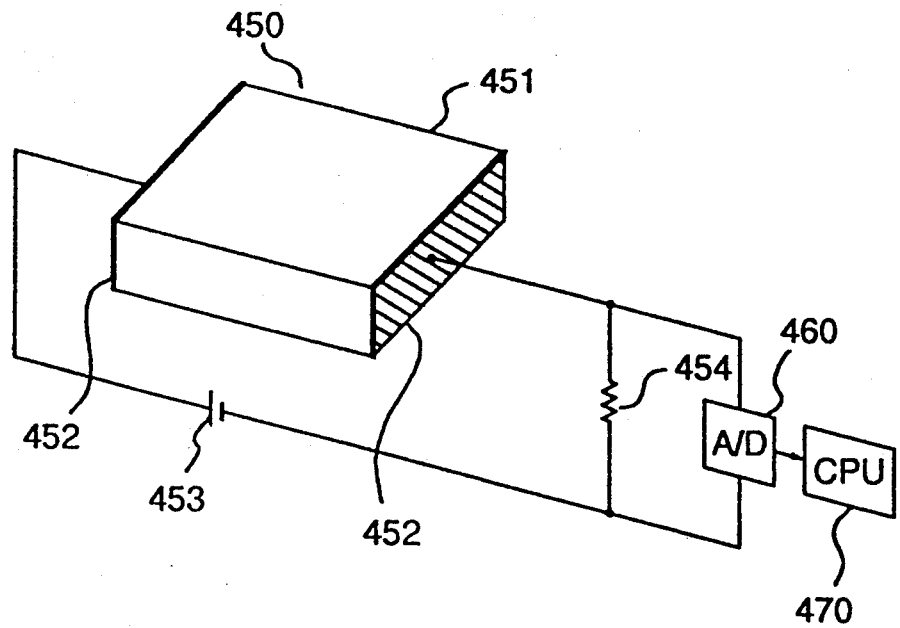
FIG. 12 is a view showing an example of sensors usable in the construction shown in FIG. 11.

FIG. 12 is a view showing an example of the construction of the infrared sensor 450 shown in FIG. 11. In FIG. 12, numeral 451 denotes a light receiver and transducer formed of an infrared conductive material such as germanium (Ge) or silicon (Si). Numeral 452 denotes ohmic electrodes, numeral 453 a DC source, and numeral 454 a load resistor. Voltages at opposite ends of the resistor 454 vary with variations in the quantity of light incident on the light receiver 451. The CPU 470 detects such variations through an analog-to-digital converter 460.

Figure 13:
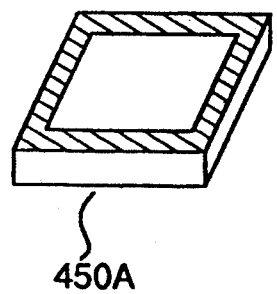
FIG. 13 is a view showing a light receiving portion of the sensor shown in FIG. 12.

In the above example, if the mirror 430 comprises a half mirror, the sensor 450 may comprise one having sensitivity to visible light. FIG. 13 is a view showing a modified obstacle detecting sensor 450A having a different shape light receiver which is shown as a hatched portion. Such a shape results in a reduced size of the light receiver which enables a clear detection of the voltage variations, thereby improving the sensor sensitivity. In the described embodiments, an obstacle is detected by means of light beams from ambient light sources. However, this is not limitative, but the user's hands holding the document and lying on part of the reading area, for example, may also be detected as obstacles. In either case, the detection may be made in the form of brightness variations.

A simplified construction for the reading area recognition will be described next. In describing this connection, reference is made to FIG. 11 since the components shown therein are substantially the same as those of the construction described below.

In this embodiment of FIG. 11, image information of the document 400 is read by the image sensor 410 through the cold mirror 430 and imaging lens 420. A reading area is recognized by means of infrared light from the infrared light pen, which is transmitted through the cold mirror 430 and imaging lens 440 to the infrared sensor 450 and converted into a signal. It is to be noted that the output of the sensor 450 is used for the reading area recognition, whereas the output of the sensor 450 described with reference to FIG. 11 is used in monitoring an obstacle present in the image pickup space.

The sensor 450 may comprise a visible light sensor if the mirror 430 is a half mirror. Further, the mirror 430 may comprise a movable, ordinary mirror which is movable between a position on an optical path for a reading operation as shown in FIG. 11 and a position for allowing the light beams to reach the sensor 450 during a reading area recognizing operation.

Figure 14:
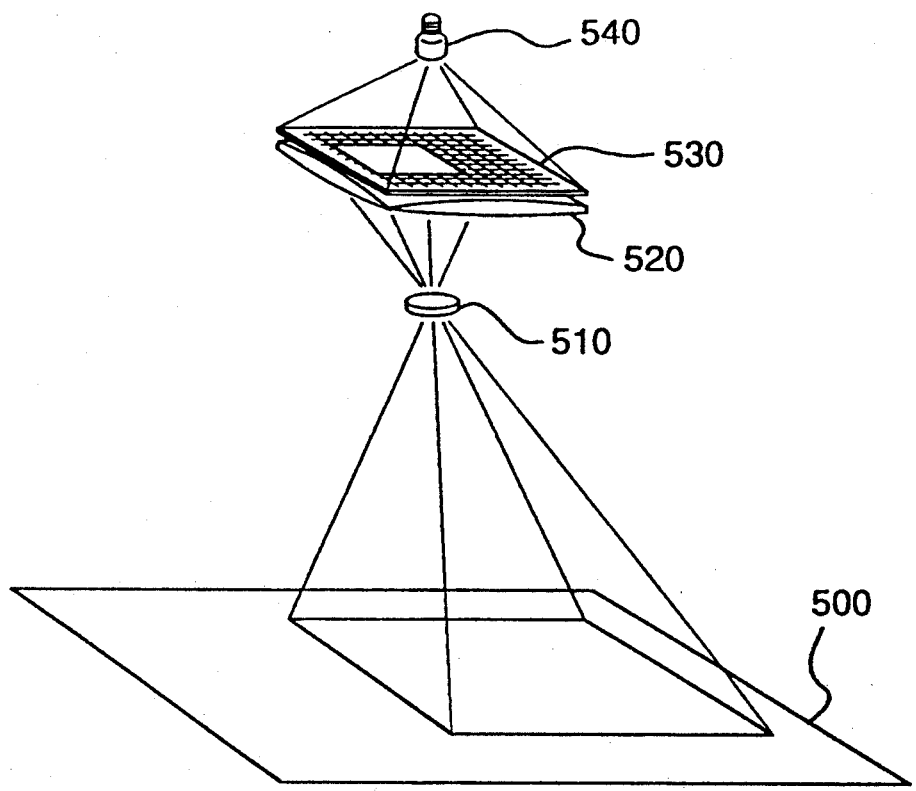
FIG. 14 is a perspective view showing light beam framing in a different embodiment.

FIG. 14 shows light beam framing in a different embodiment of the present invention. In FIG. 14, numeral 500 denotes a document, numeral 510 an imaging lens, numeral 520 a Fresnel lens, numeral 530 a liquid crystal shutter, and numeral 540 a spot light source. This embodiment has the same function as the above embodiment, and differs therefrom in the use of the spot light source 540, and the Fresnel lens 520 for increasing the brightness of the light beams on the document surface. The Fresnel lens 520 may be disposed between the liquid crystal shutter 530 and spot light source 540. Further, the Fresnel lens 520 may be replaced by a condenser lens.

The light source for the light beam framing may be used for other purposes than the light beam framing, such as for illuminating the document for reading by the user or by the reading apparatus.

Figure 15:
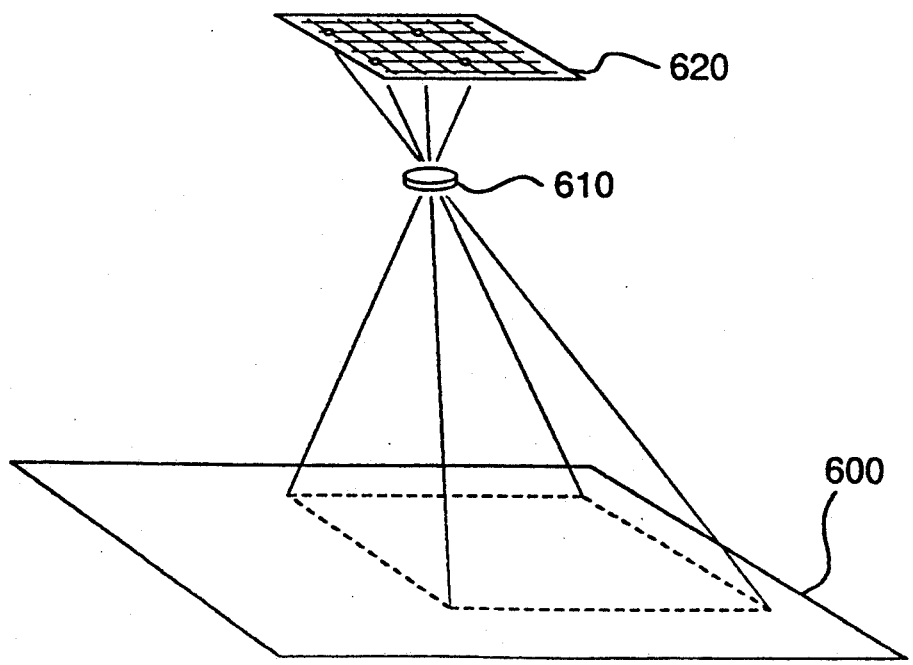
FIG. 15 is a perspective view showing light beam framing in another embodiment.

FIG. 15 shows another embodiment, in which numeral 600 denotes a document, numeral 610 an imaging lens, and numeral 620 a light source including a plurality of LEDs arranged on a two-dimensional plane. This LED light source 620 is driven by an xy driver not shown, so that the LEDs emit light defining corners of a framed area. This embodiment dispenses with the liquid crystal shutter included in the above embodiment.

Figure 16:
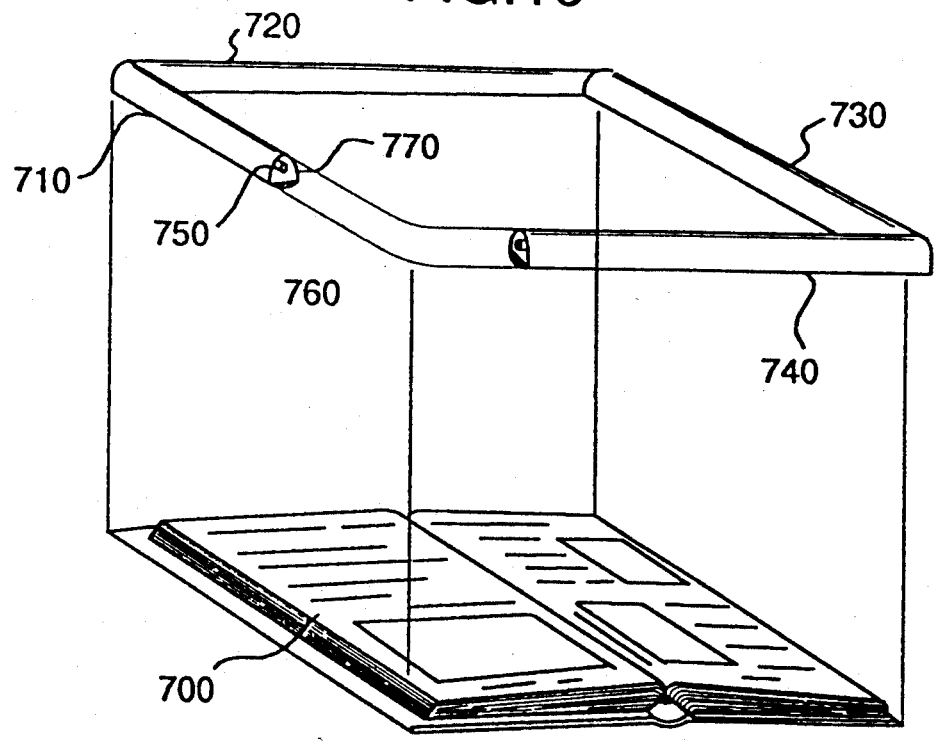
FIG. 16 is a perspective view showing light beam framing in a further embodiment.

FIG. 16 shows a further embodiment, in which numeral 700 denotes a document, and numerals 710–740 light sources. Each light source includes a linear light source 750, a cylindrical lens 760 and a cover 770 for emitting light to a surface of the document 700 to effect light beam framing thereon. This embodiment provides light beam framing only for the image reading range, but its optical system is simplified and does not require a shutter element such as a liquid crystal shutter.

Figure 17:
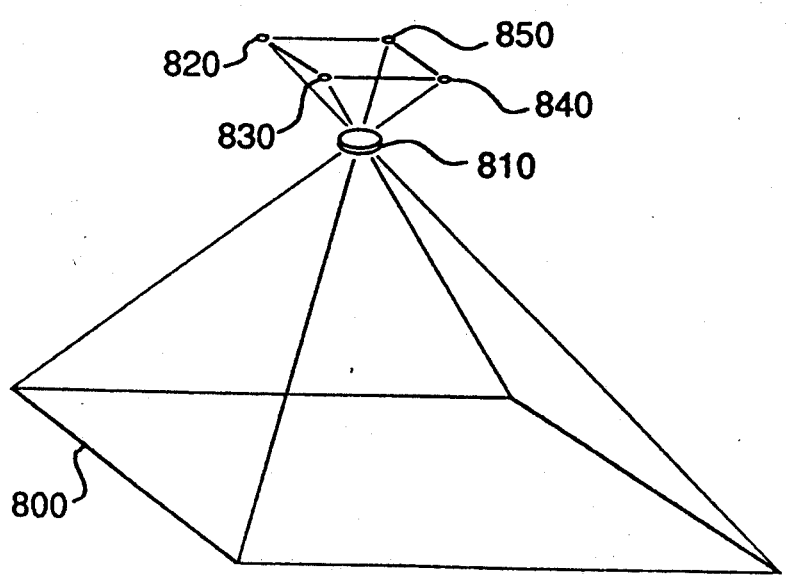
FIG. 17 is a schematic view showing a simplified form of the embodiment shown in FIG. 16.

FIG. 17 shows a simplified form of the embodiment shown in FIG. 16, which includes four LEDs 820–850 and an imaging lens 810 for forming a rectangular reading area on a document 840. This embodiment has a simpler optical system than the embodiment of FIG. 16.

The described light emitting devices for enabling the light beam framing may be turned on and off by an external operation, and may be turned on only when necessary. A shutter is not required for a light emitting device composed of a plurality of spot light sources arranged on a two-dimensional plane.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A reading apparatus comprising:

reading means for reading an area of an original placed at a predetermined distance therefrom; and light emitting means for emitting light to the reading area of said original to be read by said reading means, said light emitting means providing a variable designating image onto the original, the designating image area matching the reading area.

2. A reading apparatus as claimed in claim 1, wherein said document reading means is positioned in front of a surface of said original, which surface holds information being read by the reading means.

3. A reading apparatus as claimed in claim 1, wherein said light emitting means includes a liquid crystal element optically positioned between the original and a light source.

4. A reading apparatus as claimed in claim 1, wherein said light emitting means includes a light source emitting light reflected from a reflecting cover and through a cylindrical lens.

5. A reading apparatus as claimed in claim 1, wherein said light emitting means includes a plurality of light emitting elements.

6. An improved reading apparatus comprising:

a support member for supporting an original;

a reading means for reading an original positioned on the support member, the reading means positioned in front of a surface of said original, which surface holds information being read by the reading means; and means for projecting a frame area onto the original, the frame area matching an area of the original being read by the reading means.

7. The invention of claim 6 wherein the frame area is defined by light beams extending about the frame area.

8. The invention of claim 6, wherein the frame area is continuous over the illuminated area.

9. The invention of claim 6 further including means to disable the projecting means during a reading cycle.

10. The invention of claim 6 wherein the means for projecting a frame area includes a liquid crystal shutter display and a light source emitting light through the shutter display.

11. The invention of claim 6, further including means for designating a reading area, including a light pens and x and y position sensor elements, the light pen projecting a light beam that is simultaneously sensed by at least one x and one y sensor.

12. The invention of claim 11 further including means for determining an obstacle exists within the reading area and providing a corresponding signal.

13. A method for reading an image of an original, comprising the steps of:

projecting a designating image having an area onto the original to be read;

changing the designating image area projected onto the original to match an area of the original which is to be read, and reading the area of the original which has been designated by the designating image.

14. A system for reading a reading area of an original, comprising:

a designating image, the designating image having a designating image area projected onto the original, the designating image area being variable so that an operator can change the projected designating image area to match the reading area of the original which is to be read by the system, and means for reading the area of the original defined by the designating image.

* * * * *